Nov. 6, 1962  R. L. SCHENK, JR  3,061,913
INDEXING FIXTURE AND JIG STRUCTURE FOR PRESSES
Filed May 2, 1960  3 Sheets-Sheet 1

INVENTOR
RAYMOND L. SCHENK, JR.
BY John E. Stryker
ATTORNEY

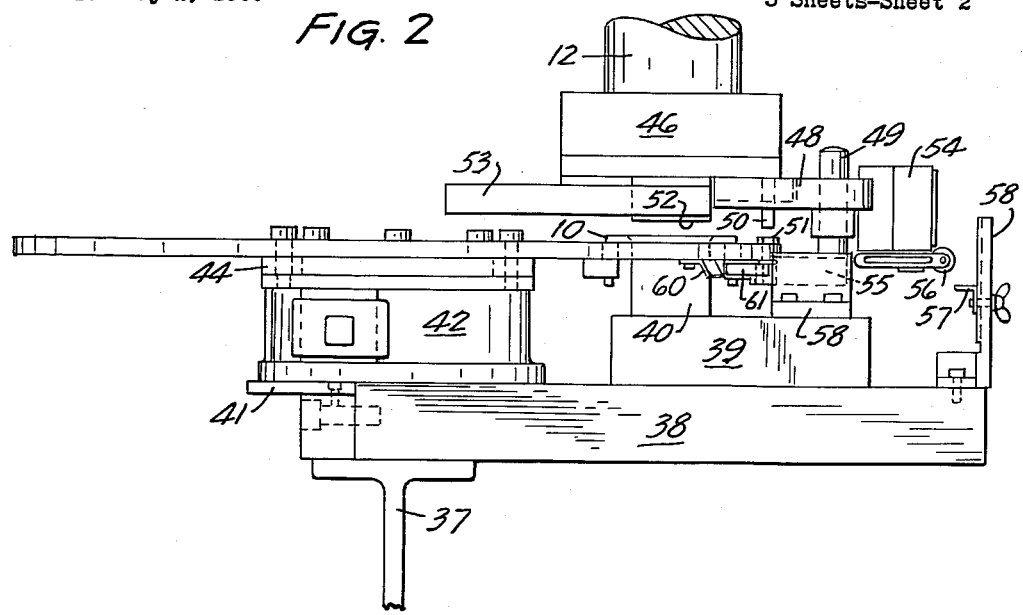
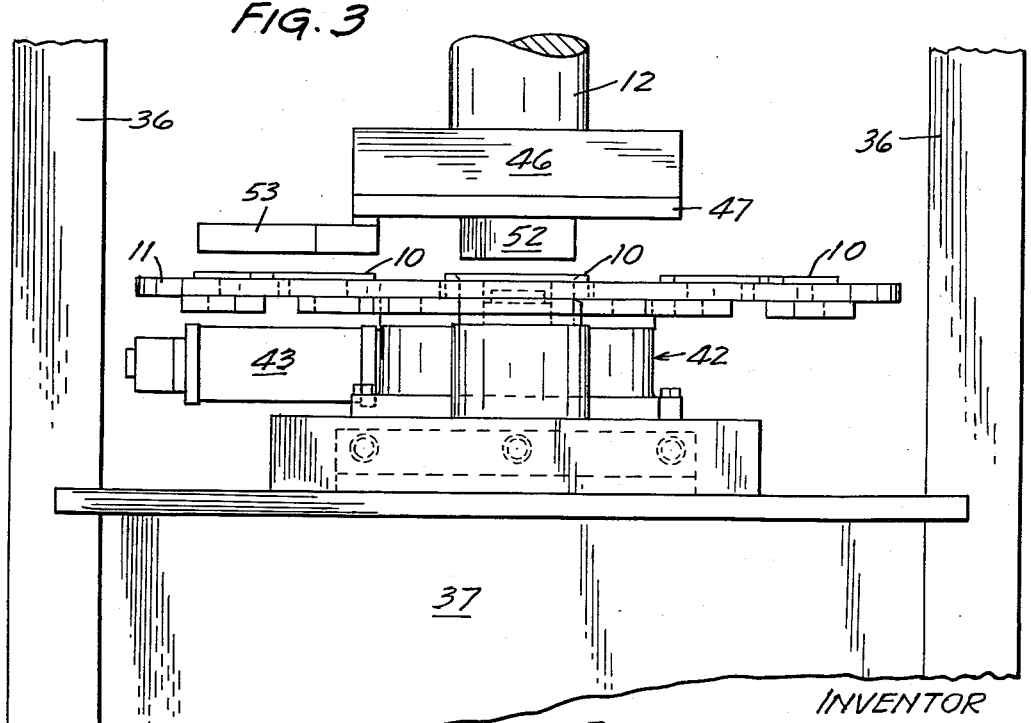

Nov. 6, 1962  R. L. SCHENK, JR  3,061,913
INDEXING FIXTURE AND JIG STRUCTURE FOR PRESSES
Filed May 2, 1960  3 Sheets-Sheet 3
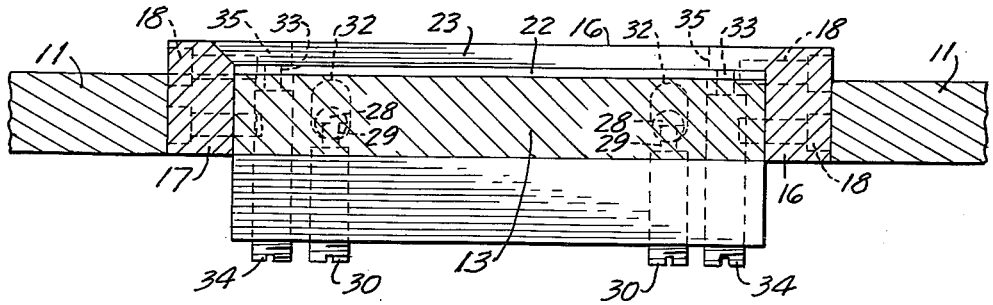
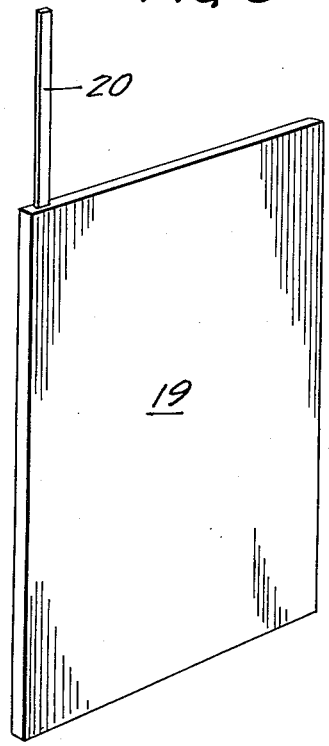
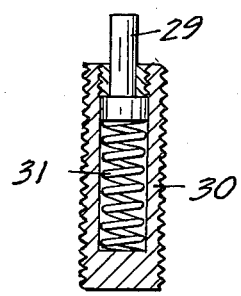
INVENTOR
RAYMOND L. SCHENK, JR.
BY
ATTORNEY

United States Patent Office 3,061,913
Patented Nov. 6, 1962

3,061,913
INDEXING FIXTURE AND JIG STRUCTURE FOR PRESSES
Raymond L. Schenk, Jr., Minneapolis, Minn., assignor to Gould-National Batteries, Inc., St. Paul, Minn., a corporation of Delaware
Filed May 2, 1960, Ser. No. 26,034
8 Claims. (Cl. 29—204)

This invention relates to an indexing fixture and jig structure for presses and particularly to a jig structure which is adapted to receive and release fragile work units which when compressed in the jig cavity are difficult to remove in undamaged condition.

It is an object of my invention to provide a novel jig having a cavity defined by a base member and walls which are retractable in relation to the base member and adapted to contain fragile work units to be compressed in the cavity and thereafter released by means which merely retract the jig sides.

A further object is to provide for a press having a vertically reciprocable ram, multiple position indexing means carrying a series of jigs, the indexing means being power actuated to automatically and sequentially move the several jigs containing work units into registry with the ram, and including means for operating the ram in timed relation to the movement of the indexing means; improved jigs and coacting ejecting or releasing means for compressed work units in the several jigs.

Other objects and advantageous features of my novel jig structure and coacting press and indexing elements will be described and particularly pointed out in the following specification and claims.

The accompanying drawings illustrate, by way of example and not for the purpose of limitation, one embodiment of my invention.

In the drawings:

FIG. 2 is a side elevational view showing the rotary table, actuating mechanism therefor and associated elements of the ejector and press as viewed from the lower side of FIG. 1;

FIG. 3 is a side elevational view of the feed table, press elements, ejector and jigs as viewed from the right side of FIG. 1;

FIG. 6 is a section taken on the line 6—6 of FIG. 4 and adjacent portion of the rotary table;

FIG. 7 is a fragmentary vertical section through one of the spring plungers for supporting the jig walls, and FIG. 8 is a perspective view showing a miniature storage battery plate which is exemplary of the fragile work units which may be compressed or compacted in the jig illustrated in the drawings.

Figure 1:
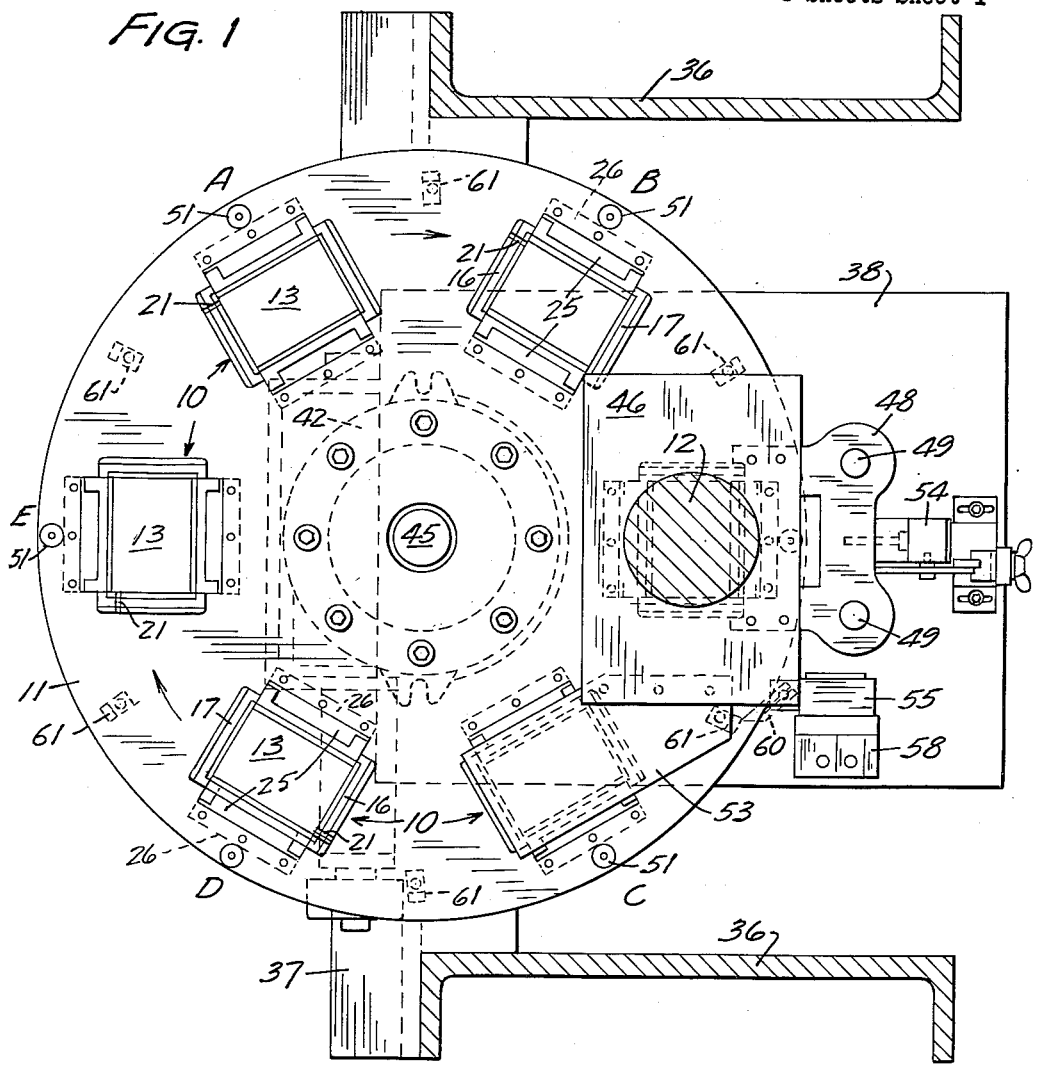
FIGURE 1 is a plan view showing a series of my improved jigs mounted on a rotary work feed table and showing, partially in plan view and partially in horizontal section, the coacting ejector and portions of a press of common type.
Figure 4:
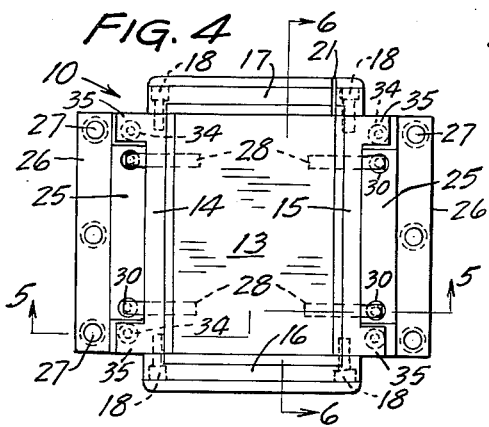
FIG. 4 is a plan view of one of my improved jigs and its guide frame.

As best shown in FIG. 1, a series of my improved jigs, indicated generally by the numeral 11, are mounted in angularly spaced relation one to another on a rotary work feed table 11. This table is adapted to be rotated by power-actuated means of suitable or conventional construction to position the jigs 10 successively in registry with the lower end of a ram indicated generally by the numeral 12. Each of the jigs has a base member 13 of generally rectangular shape and four sides 14, 15, 16 and 17 which are retractable downwardly as a unit relative to the base member. Opposite side members 16 and 17 are rigidly secured to vertical end surfaces of the sides 14 and 15 by machine screws, e.g., those indicated at 18 in FIG. 4.

Figure 5:
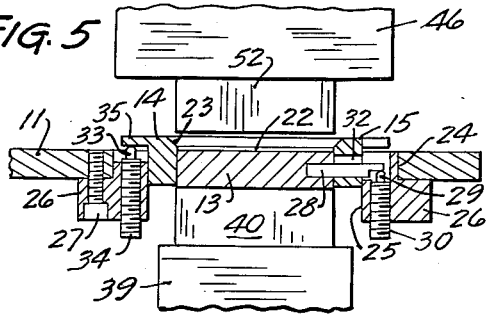
FIG. 5 is a cross sectional view taken on the line 5—5 of FIG. 4, and showing the jig in operative relation to the press ram and riser block support.

As shown in FIGS. 5 and 6, the sides 14, 15, 16 and 17 project above the normally upper surface of the base member 13 and table 11 to define jig cavities adapted to receive work units such as that shown in FIG. 8. This work unit is a miniature battery plate 19 comprising active material, or material which is to be rendered active, adhered to a fine wire grid and having a terminal conductor 20 projecting from an edge of the plate. The cavity of each of the jigs 10 is adapted to receive a plate within the confines of sides 14, 15, 16 and 17 and the side 17 has a horizontally extending groove 21 extending across its upper surface to receive the terminal conductor 20 projecting from the plate. Sides 14–17 have substantially vertical inner surfaces 22 rising from the base member 13 a distance approximately equal to the thickness of the plate 19 and outwardly and upwardly flaring surfaces 23 providing an enlarged top opening which facilitates both the placing of the work units in the jig cavities and ready removal of the units when ejected, as hereinafter described.

A series of rectangular openings, indicated at 24 in FIGS. 5 and 6, are formed in the rotary table 11 to receive the several jigs 10. Each jig is mounted between parallel frame members 25 having flanges 26 projected at the lower side of the table 11 and secured to the table along opposite sides of an opening 24 by machine screws 27. Each of the jigs 10 is resiliently supported on the table 11 to permit limited downward movement under the pressure exerted by the ram. Rigid pins 28 project horizontally from opposite sides of each of the base members 13 and have outer end portions which are supported on spring plungers 29 projecting from housings 30. Each housing 30 has a threaded connection with one of the side frame members 25 and contains a compression spring 31 (FIG. 7). Each of the pins 28 projects through a vertically elongated guide slot 32 in the adjacent side 14 or 15.

Additional spring plungers 33 resiliently support the sides of each jig, as a unit, for downward movement relative to the base member 13. There is a spring plunger 33 adjacent to each end of each side 14 and 15 and each plunger 33 projects from the upper end of a spring housing 34 beneath a lug 35 projecting from a side member 14 or 15. As shown in FIG. 5, the spring housings 34 have threaded connections with the frame members 26. The springs contained in the housings 34 are similar to the springs 31 in the housings 30, except that the springs 31 are designed to resist higher pressure than the spring in the housing 34. By this construction I make the sides of each jig downwardly retractable in relation to its base member 13 under pressure applied to the upper edges of the jig sides by the ejector hereinafter described.

As shown in FIGS. 1, 2 and 3, the illustrated press has vertical frame members 36, a horizontal beam 37 supporting a bed 38, a die holder 39 supported on the bed 38 and riser block 40, all rigidly connected together. Riser block 40 is adapted to slidably engage the bottom surfaces of the jig base members 13 as the table 11 rotates, and affords an unyielding support for the members 13 when they are slightly depressed by the press ram. A feed table mounting plate 41 (FIG. 2) is rigidly supported at the front side of the bed 38, and feed table actuating mechanism in a housing 42 is mounted on the plate 41. This mechanism is preferably of the ratchet wheel and pawl type and includes a pneumatic cylinder 43 containing a piston which is connected to the pawl for turning the table. Suitable table actuating mechanism of this type is available commercially and, per se, constitutes no part of the present invention. As an example of such mechanism and suitable electric controls therefor, reference is made to Bellows model BRET–10C rotary feed mechanism manufactured by The Bellows Company of Akron, Ohio, and described in detail in the manufacturer's Bulletin RT 1022A. Such mechanism may be used for turning the table 11 automatically in timed relation to the operation of the press ram 12. The table 11 is mounted on a spacer plate 44 and rotates about a stationary center shaft 45.

The ram 12 has fixed thereon a horizontally projecting block 46 upon which is mounted a punch holder 48 formed with openings slidably fitting a pair of vertical guide pins 49 (FIGS. 1 and 2). These pins are fixed at their lower ends on the die holder 39. A vertical locating pin 50 projects downwardly from the block 46 and is formed to fit in upwardly flaring openings in bushings 51 carried by the table 11 and each located adjacent to one of the jigs 10. As the press ram descends toward a jig in operative position in relation thereto, the locator pin 50 enters one of the bushings 51 to accurately position the jig in registry with the lower end of the ram 12 which has a lower end portion 52 of rectangular shape and of such size as to fit within the jig cavity surfaces 22 above the riser block 40. The lower face of the ram portion 52 may be a smooth plane surface or of other shape corresponding to that of the work unit to be compressed or shaped.

An important feature of this invention is the work release means or ejector which compresses an arm 53 rigidly secured to the ram block 46 and projecting therefrom in the direction of rotation of the table 11 to provide a horizontal lower surface adapted to contact and depress the sides of the several jigs successively and thereby release work units which have been compressed in the jig cavities. Rotary motion of the table 11 is imparted intermittently by the indexing mechanism in housing 42 having electric controls including limit switches of conventional type suitably disposed to activate the table 11 and ram 12 in timed relation one to the other. Two of the limit switches are indicated generally by the numerals 54 and 55 in FIGS. 1 and 2. Switch 54 is a ram trip switch and switch 55 an impulse switch. Switch 54 is normally closed and is included in a circuit for activating the mechanism in housing 42 for turning the table 11. When open, switch 54 stops the turning of the table 11 as is required when the ram is in its downwardly extended position in a jig cavity. FIGS. 1 and 2 show switch 54 mounted centrally near the rear side of the die plate 48. A switch actuating arm 56 is adapted to be tripped by contact with a dog 57 mounted on a bracket 58 secured to the press bed 38. It will be evident that the switch 54 is moved to open position when the ram descends to a position where the arm 56 is tripped by contact with the dog 57.

Switch 55 is normally open and is included in a circuit for activating the press. A mounting bracket 58 supports the switch 55 on the bed 38 and a lever arm 60 for actuating this switch normally projects in the path of a series of lugs 61 mounted on and projecting below the table 11. A switch actuating lug 61 is provided for each of the jigs 10 and is so located in relation to the associated jig as to cause the switch 55 to be closed only when a jig is in registry with the lower end of the press ram 12.

In one embodiment of my invention, each of the four springs 31 was designed to resist ten pounds of pressure on a spring plunger 29 with the result that a total force equal to forty pounds was required to depress the jig base member 13. In this embodiment, each of the four springs contained in the housings 34 was designed to resist up to five pounds of pressure thereby requiring pressure in excess of twenty pounds to retract the jig sides relative to the base member 13. It was found that ejecting pressure equal to twenty pounds distributed uniformly over the flat side of the plates 19 was sufficient to eject them from the jig cavities without damage.

*Operation*

It is evident that the illustrated fixture, table 11, is of the six station type and that each of the jigs 10 is moved from one of these stations to another, step by step. One of these stations may be designated as the ram station and the others, for convenience of reference, are indicated at A, B, C, D and E in FIG. 1. The table actuating mechanism, hereinbefore referred to, causes the jigs to dwell at the several stations for a period of time sufficient for the ram to descend into and be retracted from the cavity of a jig at the ram station. A dwell period equal to a few seconds has been found to be sufficient. Work units, such as the plates 19, are fed one at a time to the successive jigs at station A during the dwell period. The plates 19 contain powder or active material to be compacted and may be fed by hand or automatically from a feed hopper so that the terminal wire 20 of each lies in the groove 21 of the jig and projects rearwardly therefrom relative to the direction of rotation of the table.

Assuming that the table is rotated clockwise from station A, as indicated in FIG. 1, each work unit may be adjusted in the jig at station B and is then carried to the ram station where the safety switch 55 is closed by the engagement of one of the dogs 61 with the switch arm 60. This closes the ram activating circuit to cause the ram to descend and compress the work unit. As the ram is moved downwardly, limit switch 54 is actuated to open position, thereby opening the activating circuit controlling rotary movement of the table 11 so that the table is stationary during the ram stroke. Upon the withdrawal of the ram, the table advances all jigs to the next station. The compacted work unit is thus carried to station C while the succeeding work unit is moved to the ram station. Whereupon the ram descends again to compact a work unit. At the same time the ejector arm 53 descends upon and retracts the sides of a jig at station C against the pressure exerted by the spring plungers 33. Since the jig base member 13 is supported by the relatively stiff springs 31 in the housings 30 which are designed to resist compression by force sufficient to release the compacted units 19, the base member 13 ejects a compacted work unit from the cavity defined by the surfaces 22 into the enlargement of the cavity defined by the surfaces 23 of the jig sides. Following the next retraction of the ram, the ejected work unit at station C is carried to station D where the work unit is removed from the jig either manually or by automatic discharge mechanism.

When each empty jig arrives at station E its cavity may be cleansed by removing therefrom any particles of powder that may have been dislodged from the plate 19 by the ramming and ejecting operations. This jig cleaning may be performed either manually by the use of a brush or by automatic means such as an air jet directed into the mold cavity. The foregoing cycle of operation is repeated continuously.

The several base members 13 are so supported as to move freely to and from their ram positions above the riser block 40. To accomplish this, the positions of the spring housings 30 on the frame members 26 are adjusted to support the base members 13 on the plungers 29 at an elevation such that the bottom surfaces of members 13 are slightly above the top surface of the riser block 40. Clearance of a few thousandths of an inch is sufficient for this purpose. The necessary downward movement of the pins 28 supporting the base members 13 is permitted by extending the guide slots 52 formed in the side walls 14 and 15 slightly below the pins 28, when the plungers 29 are in their adjusted positions. I thus provide for both free turning of the table 11 and an unyielding support for the bottom members of the jigs when in their ram station positions.

Among the advantageous features of the present invention which have not been hereinbefore particularly pointed out, are high capacity, low cost of operation and safety to operating personnel. The compacted work units are delivered at station D at the rate of one every two or three seconds, whereas, the rate of production attained with like work units heretofore has been on the order of ten seconds per unit or longer. My invention reduces the cost of operation by reducing the number of employees required to feed the press and remove the compacted work units continuously. The physical effort required for these operations is also minimized. These advantages are obtained even with manual feeding and removal of the work units at stations A and D respectively. Greater safety to the operators is a result of the location of the stations of the operating personnel, i.e., stations A, D and E, at a safe distance from the ram station so there is no need or likelihood that the hands or any other portion of the operators' bodies will ever be extended into a zone where injury could be caused by the ram.

It will be evident that numerous changes in and modifications of the structure hereinbefore described may be made within the scope of the appended claims and that work units of many different types may be compacted in suitably modified jigs carried by the table 11.

I claim:

1. An indexing fixture and jig structure for a press having a vertically reciprocable ram comprising, a multiple position rotary table, a series of jigs carried by said table and adapted to be moved thereby successively to a position in registry with said ram, each of said jigs comprising a base member supported on said table in spaced relation to the other jigs, side walls projecting above said base member and defining an open jig cavity adapted to receive a compressible work unit, said side walls being downwardly retractable in relation to said base member, said ram having a lower end portion adapted to be extended into the cavities of the several jigs for compressing work units contained therein, and ejector means operatively connected to the ram for retracting the sides of the jig relative to the base member thereof when in a predetermined position out of registry with said ram.

2. An indexing fixture and jig structure in accordance with claim 1 in which said side walls have inner surfaces defined by lower portions extending perpendicularly to the upper surface of said base member and outwardly and upwardly flaring portions adapted to receive work units ejected from the cavity defined by said lower portions.

3. An indexing fixture and jig structure for a press having a vertically reciprocable ram comprising, a multiple position rotary table, a series of jigs carried by said table and adapted to be moved thereby successively to a position in registry with said ram, each of said jigs comprising a downwardly retractable base member resiliently supported on said table in spaced relation to the other jigs, side walls projecting above said base member for limited downward retraction in relation to said base member, said ram having a lower end adapted to be extended into the open top of the several jigs defined by said sides, and the press having a fixed riser block positioned to support said base member when in registry with the ram, whereby to compress work units contained in the jigs, and a power actuated ejector disposed to engage and retract the sides of a jig relative to the base thereof when in a predetermined position out of registry with the ram, whereby to free compressed work units in the jigs successively.

4. A fixture and jig structure in accordance with claim 3 in which said resiliently supported base member has a bottom surface which is normally spaced from the upper surface of said riser block.

5. An indexing fixture and jig structure for a press having a vertically reciprocable ram comprising, a multiple position rotary table, a series of jigs carried by said table and adapted to be moved thereby successively to a position in registry with said ram, each of said jigs comprising a base member supported on said table in angularly spaced relation to the other jigs, side walls projecting above said base member and defining an open top cavity adapted to receive a compressible work unit, spring means resiliently supporting said side walls for limited downward retraction in relation to said base member, said ram having a lower end portion adapted to be extended into the cavities of the several jigs for compressing work units contained in the cavities, and an arm carried by said ram and projecting laterally therefrom for retracting the side walls of a jig relative to the base member thereof when in a predetermined position out of registry with the ram, whereby to free compressed work units in one of said cavities simultaneously with the compression of another work unit in registry with the ram.

6. An indexing fixture and jig structure for a press having a vertically reciprocable ram comprising, a horizontally movable jig support, a jig mounted on said support and adapted to be moved thereon to a position in registry with said ram, said jig comprising a base member, side walls projecting above said base member and defining an open top cavity adapted to receive a compressible work unit, said ram having a lower end adapted to be extended into said cavity, spring means resiliently supporting said side walls for limited downward retraction in relation to said base member, and ejector means disposed to engage and retract said side walls relative to said base member when said lower end of the ram is retracted from said cavity.

7. An indexing fixture and jig structure in accordance with claim 6 including spring means resiliently supporting said base member at a predetermined elevation on said movable support and affording greater resistance to downward depression of the base member than the resistance afforded by the spring means supporting the side walls.

8. An indexing fixture and jig structure in accordance with claim 6 in which said side walls have inner surfaces defined by lower portions extending perpendicularly to the upper surface of said base member and outwardly and upwardly flaring portions adapted to loosely receive work units ejected from the cavity defined by said lower portions.

References Cited in the file of this patent

UNITED STATES PATENTS

| | | |
|---|---|---|
| 657,603 | Kraemer | Sept. 11, 1900 |
| 1,520,214 | Thomson | Dec. 23, 1924 |
| 2,604,692 | Broden | July 29, 1952 |
| 2,704,593 | Galloway | Mar. 22, 1955 |
| 2,859,859 | Winkel | Nov. 11, 1958 |